US008054971B2

(12) United States Patent
Weiner

(10) Patent No.: US 8,054,971 B2
(45) Date of Patent: Nov. 8, 2011

(54) FREE-HAND MOBILE MESSAGING-METHOD AND DEVICE

(75) Inventor: Moshe Weiner, Kiryat Savionim Yehud (IL)

(73) Assignee: Comverse Ltd, Tel Aviv (IL)

( * ) Notice: Subject to any disclaimer, the term of this patent is extended or adjusted under 35 U.S.C. 154(b) by 1850 days.

(21) Appl. No.: 09/915,563

(22) Filed: Jul. 27, 2001

(65) Prior Publication Data

US 2002/0159600 A1    Oct. 31, 2002

Related U.S. Application Data

(60) Provisional application No. 60/286,536, filed on Apr. 27, 2001.

(51) Int. Cl.
*H04L 9/00* (2006.01)
*H04L 9/12* (2006.01)
*H04L 9/32* (2006.01)

(52) U.S. Cl. ........ 380/247; 380/229; 380/255; 380/270; 455/414.4; 455/414.2; 455/414.1; 455/412.2; 382/187; 382/189; 382/186; 382/181; 382/182; 709/227; 709/238; 726/2; 726/3

(58) Field of Classification Search .................. 711/101
See application file for complete search history.

(56) References Cited

U.S. PATENT DOCUMENTS

| 5,023,718 A  * | 6/1991 | Soloff ............................ 348/715 |
| 5,946,629 A  * | 8/1999 | Sawyer et al. ................. 455/466 |
| 5,959,260 A | 9/1999 | Hoghooghi et al. |
| 5,966,667 A  * | 10/1999 | Halloran et al. ........... 455/552.1 |
| 5,974,203 A | 10/1999 | Tadokoro et al. |
| 6,092,133 A  * | 7/2000 | Erola et al. ..................... 710/301 |
| 6,125,281 A  * | 9/2000 | Wells et al. .................... 455/466 |
| 6,157,935 A | 12/2000 | Tran et al. |
| 6,178,336 B1 * | 1/2001 | Crozat .......................... 455/558 |
| 6,192,258 B1 | 2/2001 | Kamada et al. |
| 6,202,060 B1 | 3/2001 | Tran |
| 6,223,026 B1 * | 4/2001 | Martschitsch ................ 455/407 |
| 6,223,052 B1 * | 4/2001 | Ali Vehmas et al. .......... 455/551 |
| 6,292,668 B1 | 9/2001 | Alanara et al. |
| 6,304,898 B1 | 10/2001 | Shiigi |
| 6,356,769 B1 * | 3/2002 | Vehmas et al. ................ 455/551 |
| 6,400,942 B1 * | 6/2002 | Hansson et al. ........... 455/426.1 |
| 6,427,078 B1 * | 7/2002 | Wilska et al. .............. 455/550.1 |
| 6,477,274 B1 * | 11/2002 | Kim et al. ..................... 382/187 |
| 6,557,029 B2 | 4/2003 | Szymansky |
| 6,564,249 B2 | 5/2003 | Shiigi |
| 6,728,553 B1 * | 4/2004 | Lehmus et al. ............... 455/558 |

(Continued)

FOREIGN PATENT DOCUMENTS

DE      19826727 A1    12/1999

(Continued)

*Primary Examiner* — Syed A. Zia
(74) *Attorney, Agent, or Firm* — Ohlandt, Greeley, Ruggiero & Perle, L.L.P.

(57) ABSTRACT

A communication system and device that enables free-hand drawn SMS (Short Messaging Service) messages to be transmitted and received from/to various user devices. A buffer device is inserted within a GSM compatible handset providing a buffer for both conventional SMS messages created by typing a message on the keypad of the handset and for free-hand drawn SMS messages created by drawing or writing the free-hand message on a data entry device. An optional OCR (Optical Character Recognition) facility can be provided in either the buffer device inserted within the handset or in a network server that receives the transmitted message and processes it for proper routing to the intended recipient.

16 Claims, 10 Drawing Sheets

U.S. PATENT DOCUMENTS

| | | | |
|---|---|---|---|
| 6,763,373 B2 * | 7/2004 | Shiigi | 709/206 |
| 6,766,177 B2 * | 7/2004 | Chambon et al. | 455/550.1 |
| 6,792,143 B1 * | 9/2004 | Harmovaara | 382/189 |
| 6,832,013 B1 * | 12/2004 | Kuhmann et al. | 385/14 |
| 6,832,103 B2 * | 12/2004 | Namiki | 455/558 |
| 6,847,816 B1 * | 1/2005 | Sarradin | 455/407 |
| 7,003,306 B2 * | 2/2006 | Henry-Labordere | 455/466 |
| 7,089,036 B2 * | 8/2006 | Prise | 455/558 |
| 7,502,622 B1 * | 3/2009 | Lekutai | 455/466 |
| 7,865,197 B2 * | 1/2011 | Swerup et al. | 455/466 |
| 2001/0033293 A1 * | 10/2001 | Hollstrom et al. | 345/705 |
| 2001/0049289 A1 * | 12/2001 | Kim | 455/466 |
| 2002/0010006 A1 | 1/2002 | Wang | |
| 2002/0016186 A1 * | 2/2002 | Chambon et al. | 455/558 |
| 2002/0035687 A1 * | 3/2002 | Skantze | 713/168 |
| 2002/0046249 A1 * | 4/2002 | Shiigi | 709/206 |
| 2002/0115446 A1 * | 8/2002 | Boss et al. | 455/456 |
| 2002/0151295 A1 * | 10/2002 | Boss et al. | 455/412 |
| 2003/0133423 A1 * | 7/2003 | LaDue | 370/330 |
| 2005/0269399 A1 * | 12/2005 | Bensimon et al. | 235/380 |
| 2006/0072756 A1 * | 4/2006 | Leimgruber et al. | 380/270 |
| 2008/0126415 A1 * | 5/2008 | Chaudhury et al. | 707/104.1 |
| 2008/0221862 A1 * | 9/2008 | Guo et al. | 704/2 |
| 2009/0017765 A1 * | 1/2009 | Lev | 455/66.1 |
| 2010/0030810 A1 * | 2/2010 | Marr | 707/104.1 |
| 2011/0081926 A1 * | 4/2011 | Monteiro et al. | 455/466 |

FOREIGN PATENT DOCUMENTS

| | | |
|---|---|---|
| DE | 100 28 138 A1 | 12/2001 |
| EP | 0 717 367 A1 | 6/1996 |
| EP | 0 782 357 A2 | 7/1997 |
| EP | 0 865 192 A2 | 9/1998 |
| EP | 0 875 821 A2 | 11/1998 |
| EP | 0 907 278 A2 | 4/1999 |
| EP | 1 104 153 A2 | 5/2001 |
| EP | 1 122 934 A2 | 8/2001 |
| GB | 2 289 555 A | 11/1995 |
| GB | 2 308 523 A | 6/1997 |
| GB | 2 348 082 A | 9/2000 |
| JP | 9-130507 | 5/1997 |
| WO | WO 99/37105 | 7/1999 |
| WO | WO 99/48268 | 9/1999 |
| WO | WO 00/49731 | 8/2000 |
| WO | WO 01/16691 A1 | 3/2001 |
| WO | WO 01/26280 A1 | 4/2001 |
| WO | WO 01/31567 A1 | 5/2001 |
| WO | WO 01/38966 A2 | 5/2001 |
| WO | WO 01/49056 A1 | 7/2001 |
| WO | WO 01/61449 A2 | 8/2001 |
| WO | WO 01/61636 A2 | 8/2001 |
| WO | WO 01/71651 A1 | 9/2001 |
| WO | WO 01/75781 A1 | 10/2001 |
| WO | WO 01/77796 A2 | 10/2001 |
| WO | WO 01/95091 A1 | 12/2001 |
| WO | WO 027410 A2 * | 1/2002 |

* cited by examiner

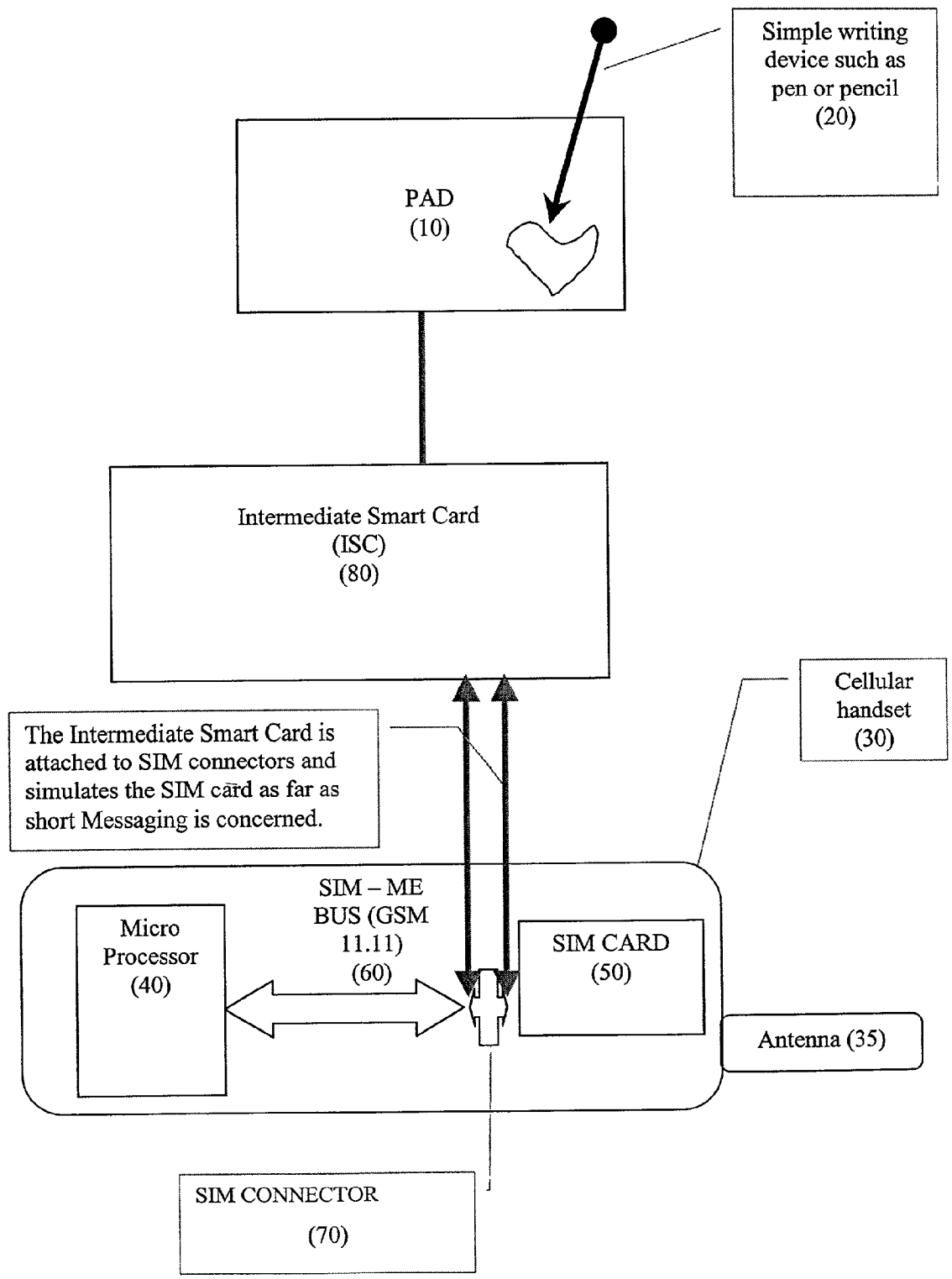

FIG. 2 - System Block Diagram
Possible structure of the Pad
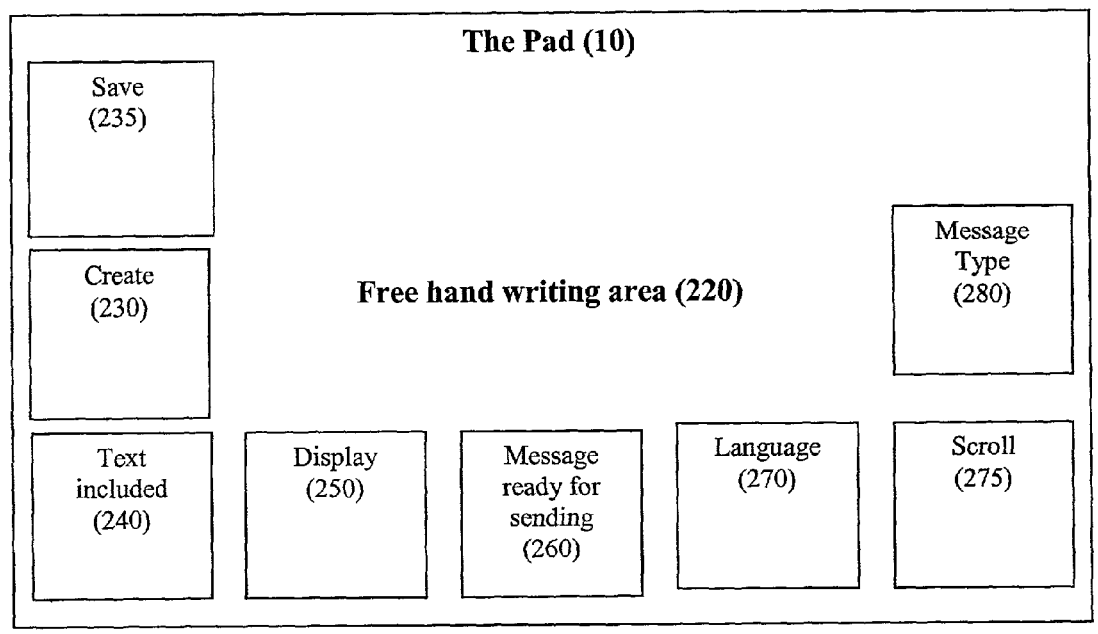

FIG. 3 - System Block Diagram
Structure of the Intermediate Smart Card (ISC)
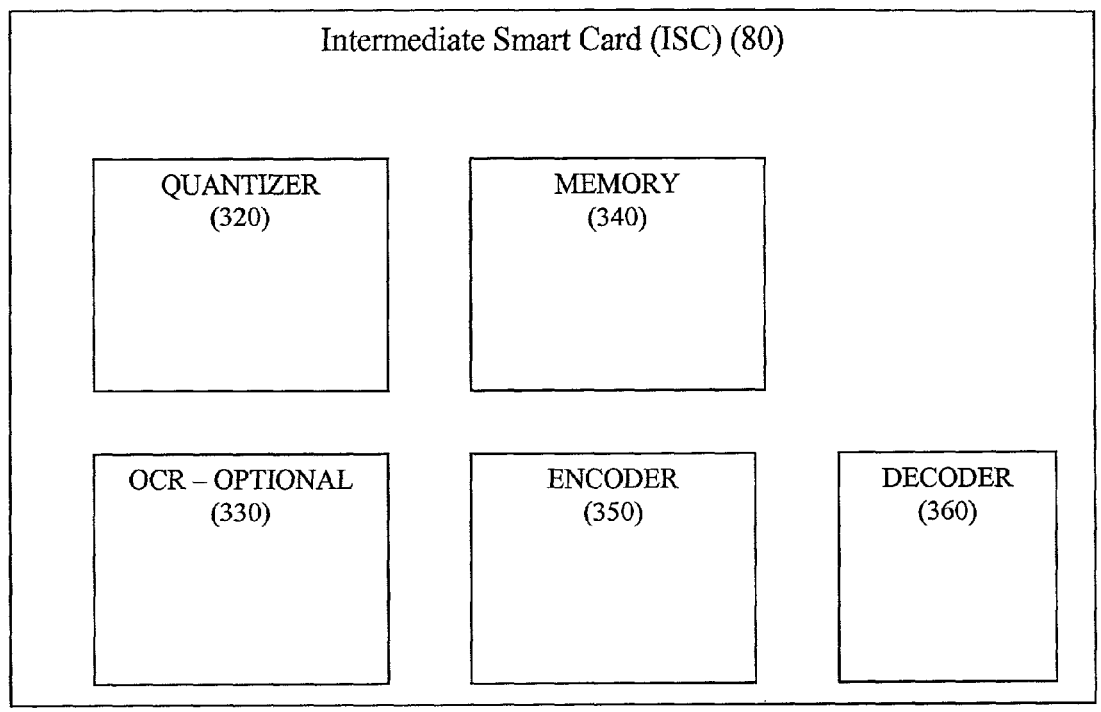

FIG. 4 - System Block Diagram
Integration within the Cellular Network
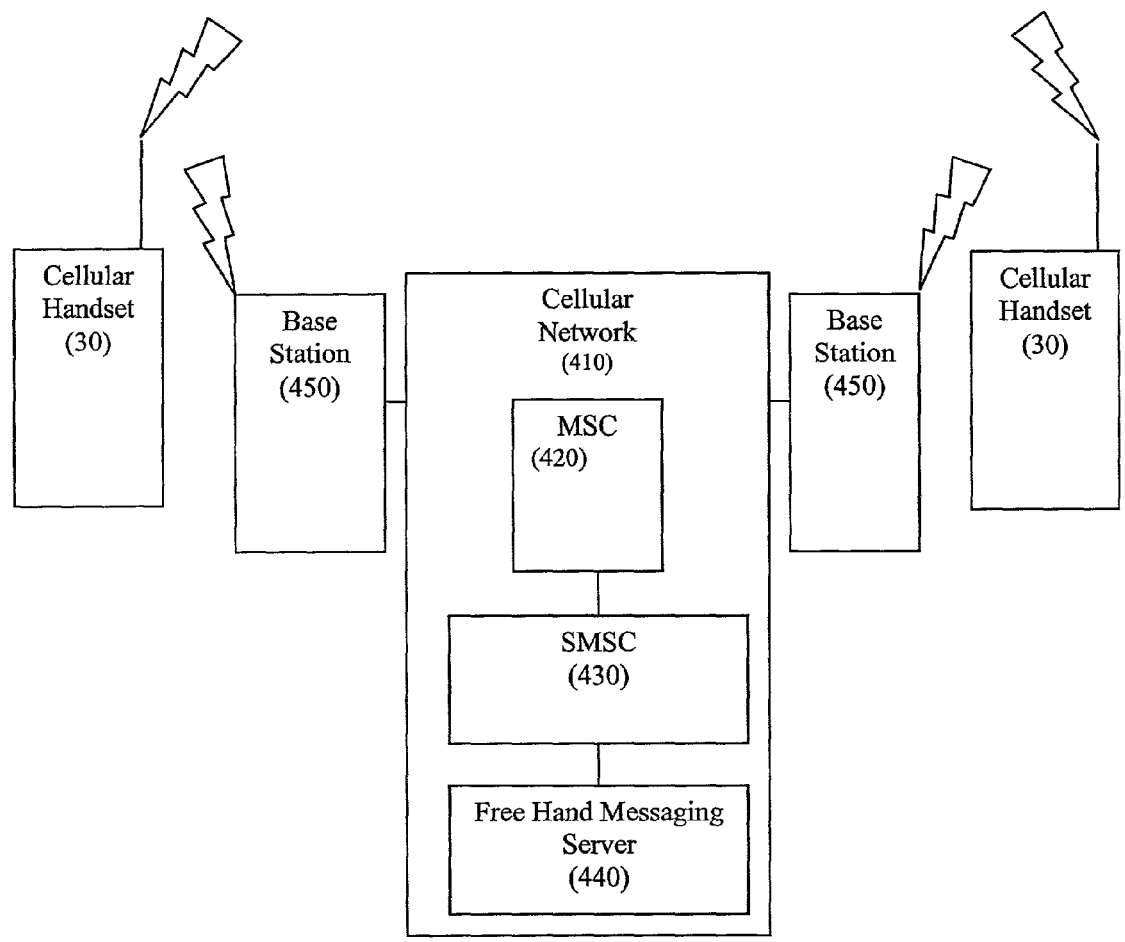

FIG. 5 - System Block Diagram
Free Hand Messaging Server - Structure
Free Hand Messaging Server (440)
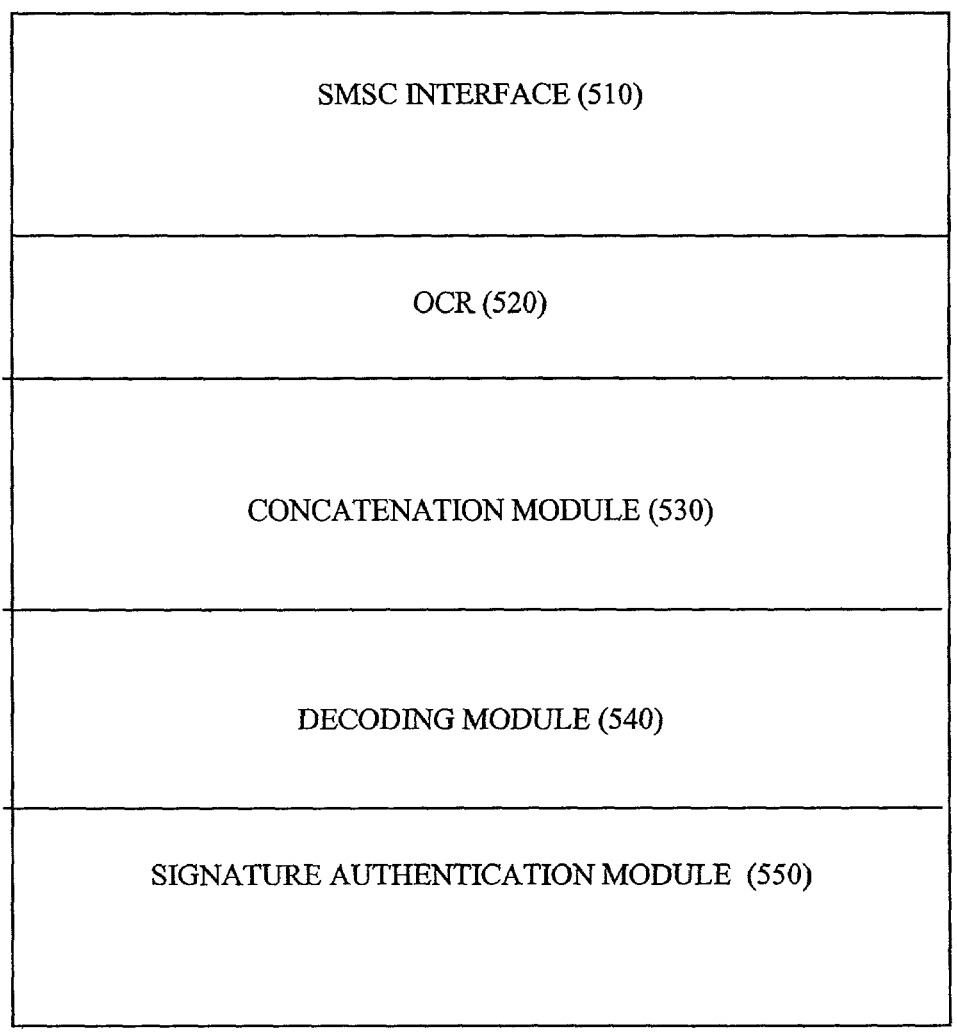

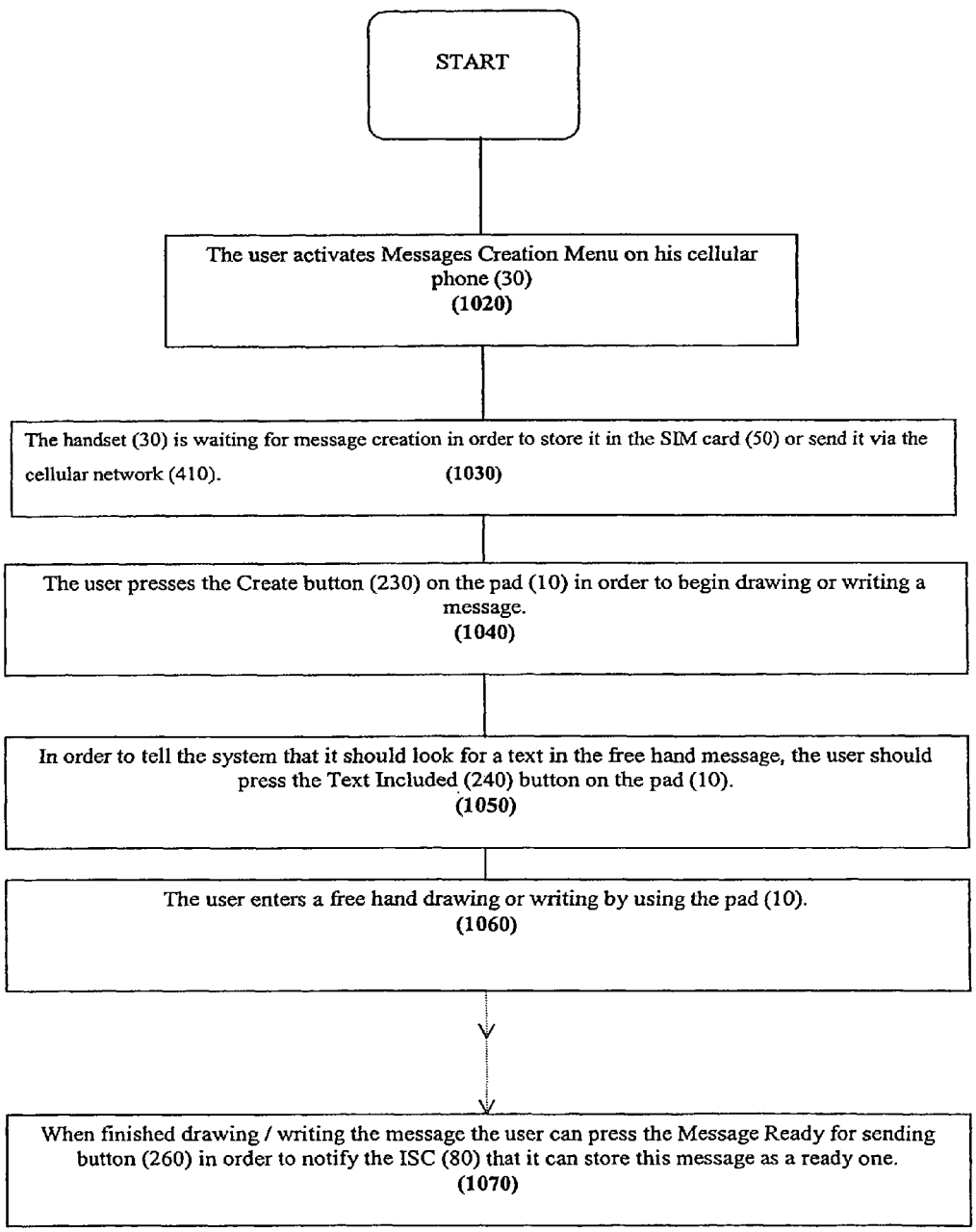
FIG. 6 - The Process – MO (Mobile Originated)

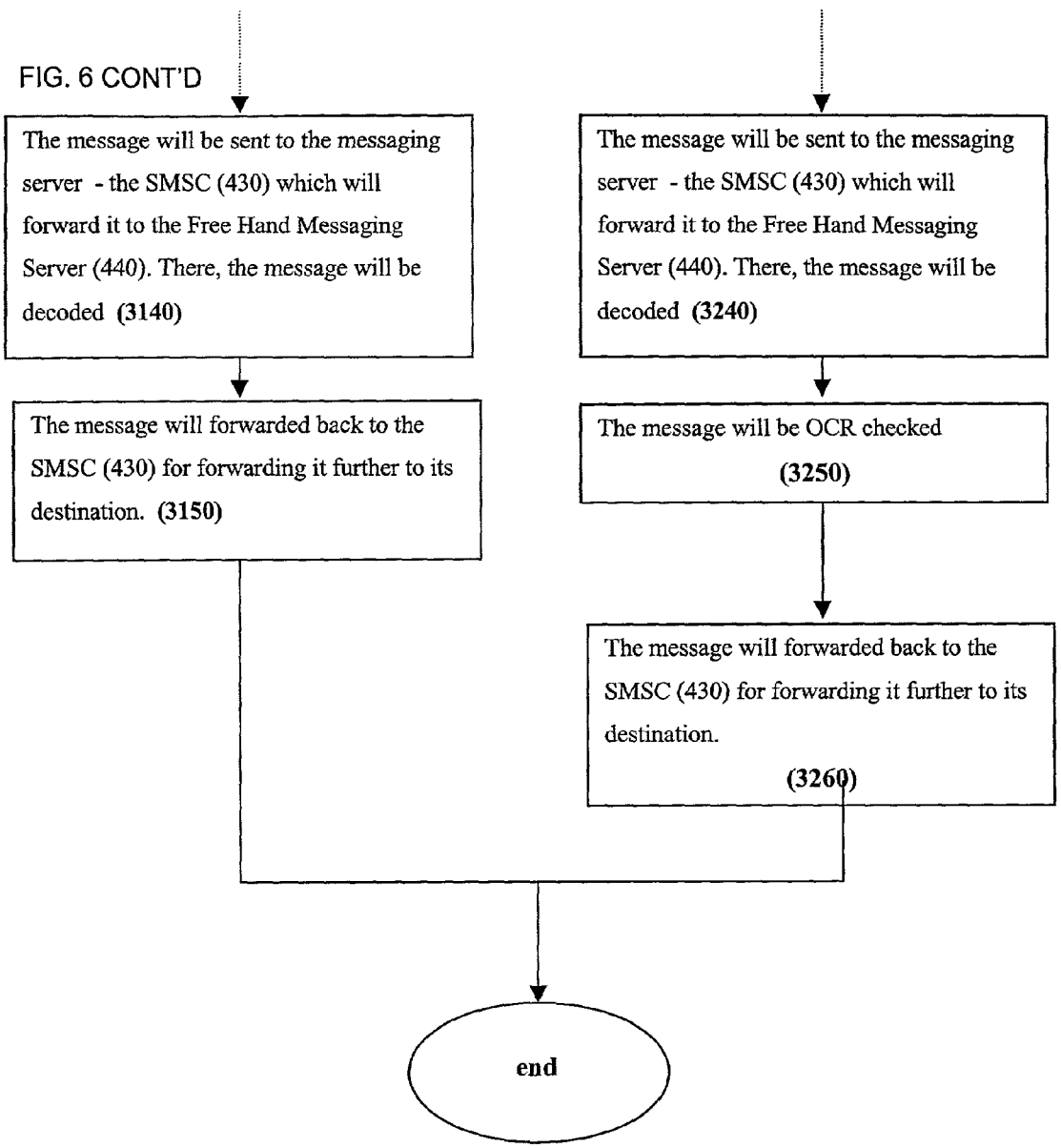

FIG. 7 - The Process – MT (Mobile Terminated)
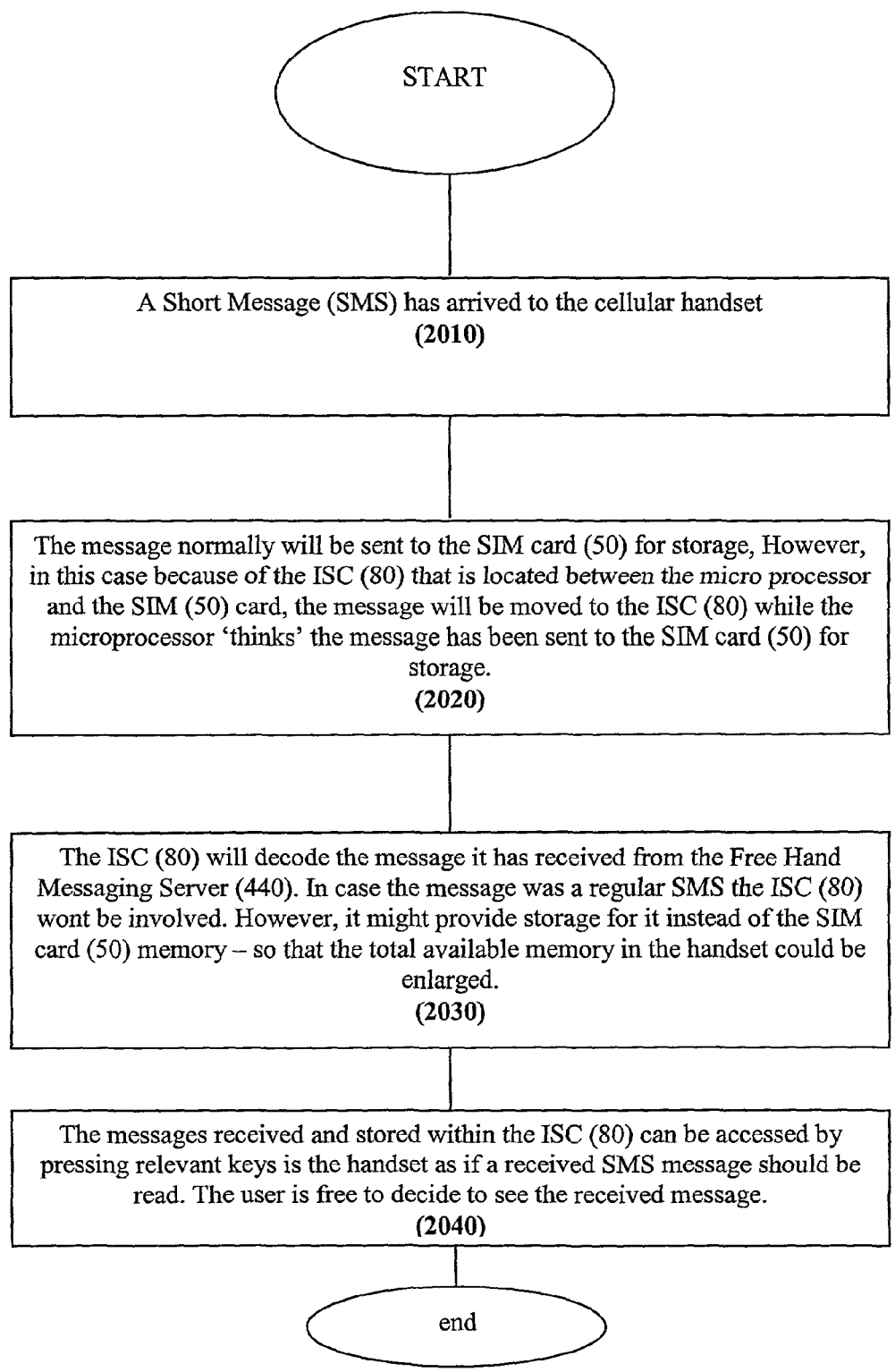

FREE-HAND MOBILE MESSAGING-METHOD AND DEVICE

CROSS REFERENCE TO RELATED APPLICATIONS

This application is filed under 35 U.S.C. §111(a), claiming benefit pursuant to 35 U.S.C. §119(e)(1) of the filing date of the Provisional Application 60/286,536 filed on Apr. 27, 2001 pursuant to 35 U.S.C. §111(b). The Provisional Application is incorporated herein by reference for all it discloses.

BACKGROUND OF THE INVENTION

1. Field of the Invention

The present invention generally relates to the field of mobile handset communication. More particularly, this invention relates to improved techniques in the areas of SMS (Short Messaging Service), EMS (Enhanced SMS) and Inage messaging with respect to a GSM (Global System for Mobile Communication) communications network.

2. Description of the Related Art

There are two basic types of services offered through GSM: telephony (also referred to as teleservices) and data (also referred to as bearer services). Telephony services are mainly voice services that provide subscribers with the complete capability (including necessary terminal equipment) to communicate with other subscribers. Data services provide the capacity necessary to transmit appropriate data signals between two access points creating an interface to the network. In addition to normal telephony and emergency calling, GSM supports dual-tone multifrequency (DTMF), facsimile group III, cell broadcast, voice mail, fax mail and short message services (SMS).

The latter of the above-referenced GSM facilities, SMS, is the service most relevant to the present invention. According to the SMS service, a message consisting of a maximum of 160 alphanumeric characters can be sent to or from a mobile station. This service can be viewed as an advanced form of alphanumeric paging with a number of advantages. If the subscriber's mobile unit is powered off or has left the coverage area, the message is stored and offered back to the subscriber when the mobile unit is once again powered on or has reentered the coverage area of the network. This function ensures that the message will be received.

The SMS service makes use of an SMSC (Short Message Service Center), which acts as a store-and-forward system for short messages. The wireless network provides the mechanisms required to find the destination station(s) and transports short messages between the SMSC and wireless stations. In contrast to other existing text-message transmission services, such as alphanumeric paging, the service elements are designed to provide guaranteed delivery of text messages to the destination. Additionally, SMS supports several input mechanisms that allow interconnection with different message sources and destinations.

A distinguishing characteristic of the SMS service is that an active mobile handset is able to receive or submit a short message at any time, independent of whether a voice or data call is in progress. In some implementations, this may depend on the MSC (Mobil Switching Center) or SMSC capabilities. As mentioned above, SMS also guarantees delivery of the short message by the network. Temporary failures due to unavailable receiving stations are identified, and the short message is stored in the SMSC until the destination device becomes available.

SMS is also characterized by out-of-band packet delivery and low-bandwidth message transfer, which results in a highly efficient means for transmitting short bursts of data. Initial applications of SMS focused on eliminating alphanumeric pagers by permitting two-way general-purpose messaging and notification services, primarily for voice mail. As technology and networks evolved, a variety of services have been introduced, including e-mail, fax, paging integration, interactive banking, information services such as stock quotes, and integration with Internet-based applications. Wireless data applications include downloading of SIM (Subscriber Identity Module) cards for activation, debit, profile-editing purposes, wireless points-of-sale (POSs), and other field-service applications such as automatic meter reading, remote sensing, and location-based services. Additionally, integration with the Internet spurred the development of Web-based messaging and other interactive applications such as instant messaging, gaming, and chatting.

One of the most popular ways an SMS message is sent and/or received is via a GSM handset equipped with SMS capabilities. An identification number is first stored in the memory of the handset. This identification number identifies the Mobil Switching Center (MSC) to which each SMS message from that particular handset will be sent for proper distribution to the intended recipient. The identification number only needs to be stored once and each time an SMS message is generated using that handset, the stored number is used for message routing.

After storing the proper MSC identification number, SMS messages are typically created using the GSM handset by manually entering a combination of message text and/or characters by pressing the appropriate keys located either on the handset itself or on an accessory keyboard that can be operably attached to the handset or Personal Digital Assistant (PDA). According to the SMS standard, up to 160 characters can be sent in each SMS message.

Currently, free-hand message creation, i.e., messages drawn freely by the author using symbols, characters, text, pictures or any other desired nomenclature, as opposed to using predetermined keystrokes, such as in conventional SMS messaging, is known with respect to PDAs. However, such devices are quite expensive and complicated when compared to a conventional cellular handset, i.e., 2G or, second generation handsets. In addition to PDAs, there are certain other approaches that permit free-hand message creation. These other approaches, however, typically require additional hardware devices that work in conjunction with cellular handsets and they are unique for each handset. For example, some known devices must connect to the handset's external connector, which is a proprietary connection for each handset. Furthermore, these externally attached modules are both large and expensive.

Also, the devices that allow free-hand message transmission comprise handsets with externally connected modules that are not generic with respect to the handset. This contributes to increased costs, typically making these devices very expensive when compared to the cost of a cellular handset. PDAs, on the other hand, do not require any attachments, but PDAs cannot send free-hand drawn images. Also, PDA devices are expensive when compared to regular second generation cellular handsets. Lastly, entering message data is even more complicated when it is desired to send a message using characters not supported by the keypad of the device, e.g., Chinese characters.

SUMMARY OF THE INVENTION

To address the above-mentioned deficiencies in conventional mobile communication devices, it is an object of the present invention to provide a relatively inexpensive and compact device that allows for free-hand generation and reception of messages in different formats, such as SMS message format.

While the SMS message format is a convenient format to reference when describing the present invention, it is not the only data transport method with which the present invention can be used. For example, Multi Media Messaging on GSM handsets, free hand WAP browsing, free hand inputs for GPRS and 3G phones, etc., all represent additional data transport methods that can be used to send "free-hand" messages in accordance with the present invention.

Creating and sending an SMS message using "free-hand" writing or drawing, as opposed to creating and sending an SMS message by manually pressing keys on the keypad of the device, is a convenient and welcome improvement over conventional communication devices. Allowing free-hand drawn messages would, for example, enable faster, more efficient, message transfer and it would also enable a variety of new services. Wireless banking, a service that would benefit from using free-hand drawn signatures for service verification, is one such new service.

One embodiment of the present invention generally deals with communication involving a GSM (Global System for Mobile Communication) enabled instrument, such as a handset or PDA (Personal Digital Assistant). A device in accordance with the invention facilitates the transfer of standard GSM formatted data into the handset for transmitting and receiving over a network (without the need of a handset-proprietary data format). One example of a device in accordance with the invention is a handset that enables a user to create an SMS message using free-hand writing. A further embodiment of the invention enables the user to send a free-hand drawn image and also identifies the handwriting as characters. Thus, providing simple creation of complicated characters, such as Chinese characters.

The present invention also eliminates the complicated use of a small handset keyboard. The invention can be used in conjunction with second-generation cellular devices as well as more advanced sets of 2.5G and 3G (third generation) devices. One of the innovative aspects of this invention is that it is generic, i.e., not handset dependent, and because it interfaces with the standard preexisting data communication channels within the device, it works with all handsets without requiring a proprietary interface. Further, it is a very low cost solution with respect to each handset and there is no need to make special major adaptations for various cellular handsets.

A communication device in accordance with one embodiment of the present invention, for example, an embodiment using SMS messaging as the data transport mechanism, includes a master microprocessor to which a security identity module is operably connected through a signal bus. Most conventional mobile handsets that both send and receive messages include these features. However, in accordance with the present invention, an additional buffering device is provided within the device that can communicate with the master microprocessor and the security identity module.

If a message created using the communication device, and then delivered to the internal master microprocessor, is a free-hand drawn message, the message is sent to and processed by the buffering device prior to transmission. In the buffering device, the message is converted into a format compatible with a format selected by the user on a data entry pad. For example, the message can be converted to an SMS message format, facsimile data format, electronic mail format, etc. The message can be further processed by such facilities as optical character recognition for text character data, or converted and/or compressed into formats such as bitmap format, jpeg format or any other graphic representative format.

After a message has been created and is ready for sending, it is transmitted through a network, where additional processing can optionally be performed, and is routed to the intended recipient of the message where, using a communication device similar to the one used to create and transmit the message, the message is converted back into a format readable by the recipient.

BRIEF DESCRIPTION OF THE DRAWINGS

The above object and advantages of the present invention will become more apparent by describing in detail a preferred embodiment thereof with reference to the attached drawings in which:

FIG. 1 is a block diagram showing an embodiment of the handset used in accordance with the present invention.

FIG. 2 is a block diagram showing an embodiment of the pad used to input data in accordance with the present invention.

FIG. 3 is a block diagram showing an embodiment of the Intermediate Smart Card used in accordance with the present invention.

FIG. 4 is a block diagram showing an embodiment of how a handset can be integrated with a cellular network in accordance with the present invention.

FIG. 5 is a diagram illustrating an embodiment of the free-hand messaging server in accordance with the present invention.

FIG. 7 is a flow chart illustrating the process of the present invention during a mobile terminated communication.

DETAILED DESCRIPTION OF THE PREFERRED EMBODIMENTS

Figure 6:
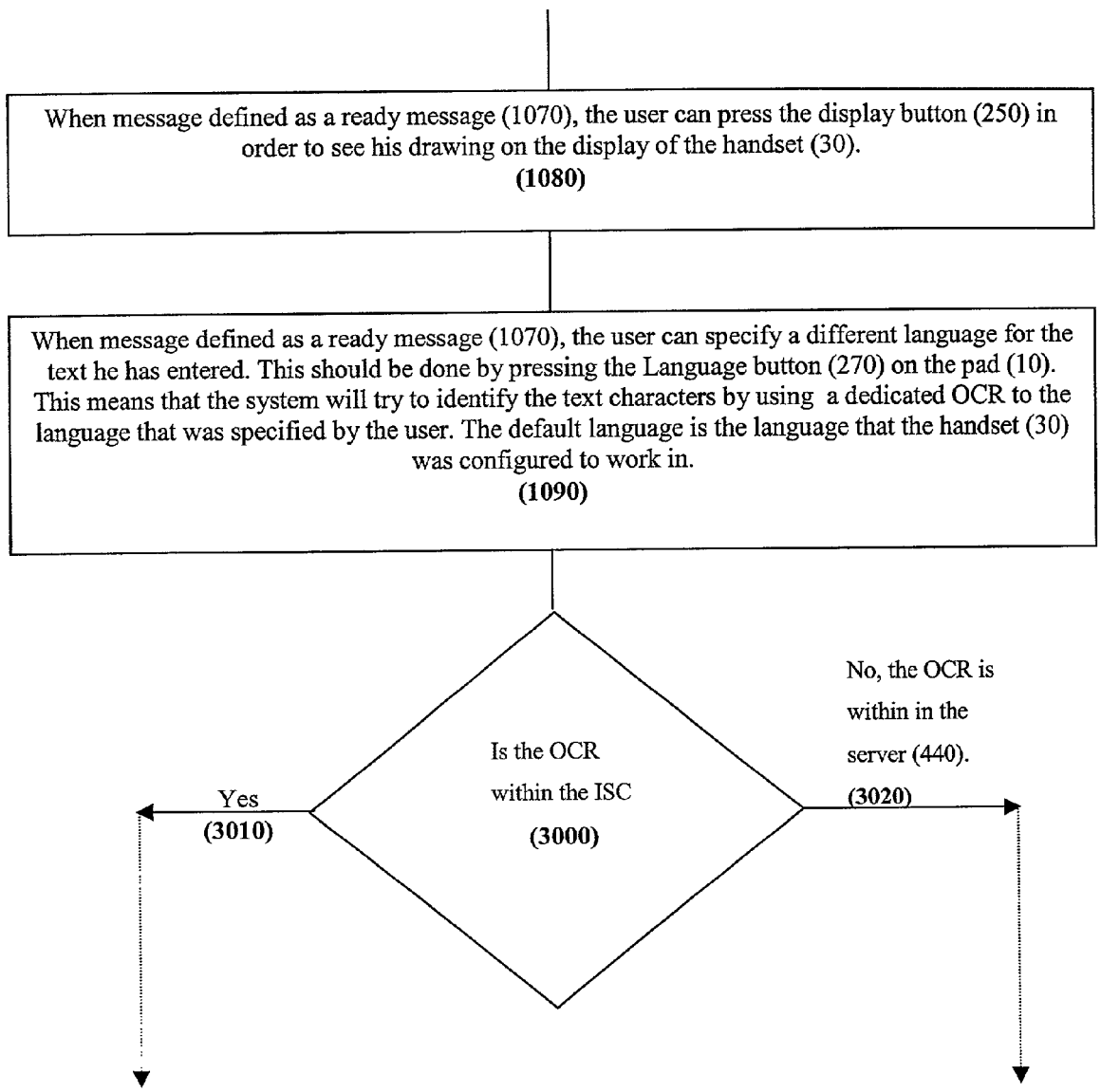
FIG. 6 is a flow chart illustrating the process of the present invention during a mobile originated communication.
Figure 6:
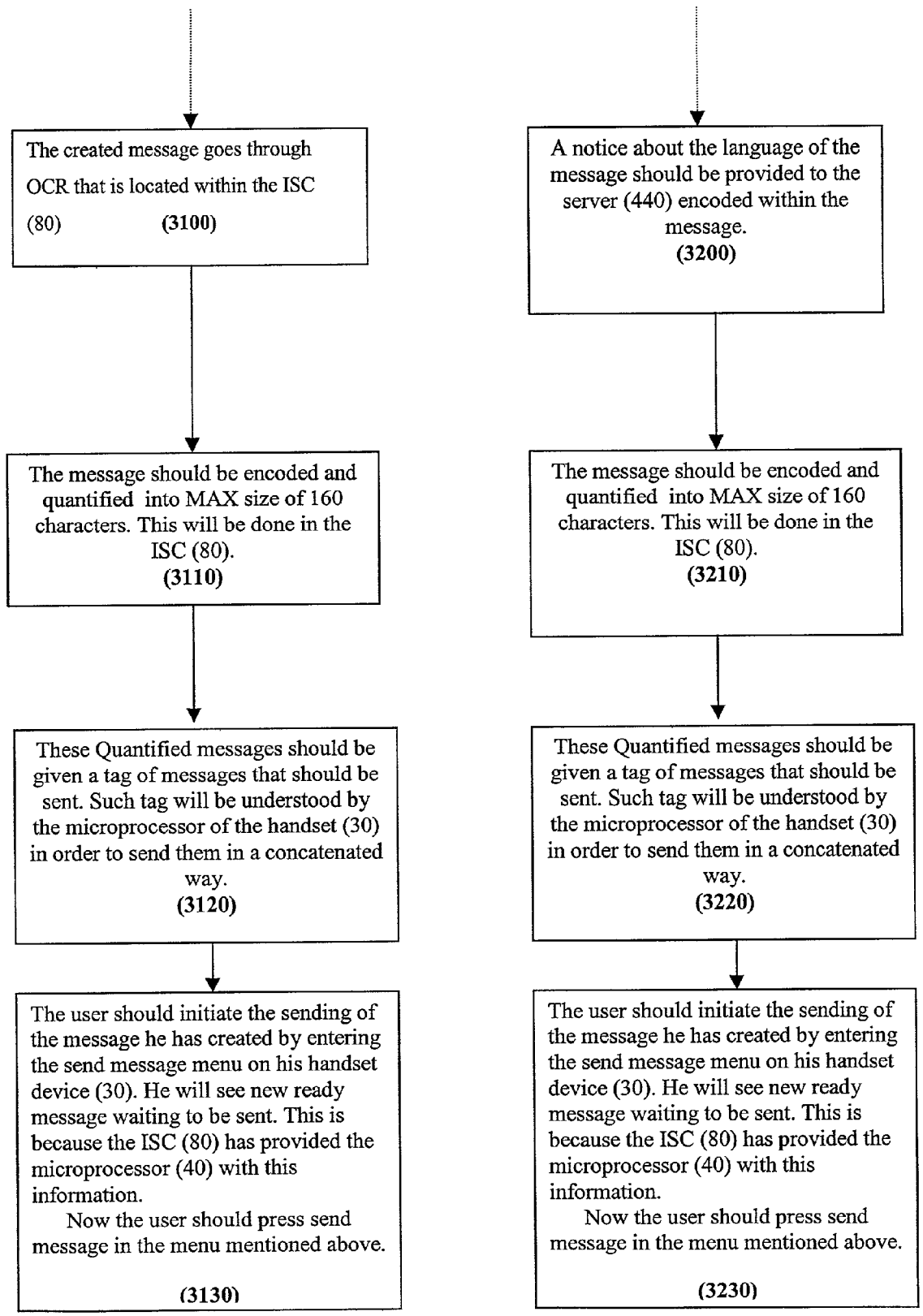

Hereinafter, an embodiment of the present invention will be described in detail with reference to the attached drawings. Within the discussion provided, the term "handset" refers to a mobile communication device. However, the term "GSM instrument" may be used instead of "handset" since any GSM compatible device that utilizes a SIM card can be used in connection with the embodiment of the present invention addressed here.

Although the present invention has been set forth herein with respect to the GSM technology and its attendant specifications, the invention is by no means limited to this specific technology alone. For example, other technologies, both wireless as well as wireline, can support the present invention.

FIG. 1 illustrates a handset in accordance with one embodiment of the present invention. GSM handset (30) includes a microprocessor (40), which acts as a "master" microprocessor, and a SIM card (50). The SIM card (50) also includes a separate microprocessor (not shown) that acts as a "slave" microprocessor. The master microprocessor (40) and the SIM card (50) communicate with each other according to GSM standard 11.11, which is also known as the ETSI TS 100 977 specification (ETSI stands for European Telecommunications Standard Institute, and TS stands for Technical Specification). The GSM 11.11 standard is implemented in all GSM ver. 2+ handsets and it defines the interface between the microprocessor (40) and the SIM card (50).

According to GSM 11.11, it is possible to create and store short messages in the SIM card (50). The Mobile Equipment (ME), which comprises the handset (30) controlled by its microprocessor (40) in this embodiment, can initiate creation of an SMS message by inputting message data using the keys of the handset and processing the data in microprocessor (50). Additionally, according to this embodiment, a buffer device is placed within the handset. The buffer device buffers communications between the microprocessor (40) and the SIM card (50) when, for example, messages such as those associated with SMS messaging are concerned. A buffer device in accordance with the present embodiment is illustrated as Intermediate Smart Card (ISC) (80).

ISC (80) is connected between the SIM card (50) and the master microprocessor (40). One example of how the ISC (80) can be connected is through the SIM connector (70). More specifically, an additional connector can be provided at the SIM connector (70) that contains a wire that connects to a "dual" connector. The dual connector allows the SIM card (50) and the ISC (80) to both be connected, simultaneously, to the SIM connector (70) without one corrupting the data being sent to/from the other.

While the above-mentioned connection method for the ISC (80) is the preferred method of connection, other implementations for connecting the ISC (80) to the handset (30) can be utilized. For example, it is not necessary that the ISC (80) be connected directly between the SIM card and the microprocessor. It is possible for the ISC to interface exclusively with either the microprocessor or the SIM card and receive from either of these devices that data which must be sent to the ISC for processing, i.e., free-hand SMS data. However, GSM 11.11 provides the necessary information for connecting the ISC (80) to SIM connector (70). Thus, the SIM connector is a convenient place for the ISC to interface.

When it is desired to send an SMS message via the handset (30), the message is created by either typing the characters on the keypad in the conventional manner or, according to the present invention, the user can prepare the message using a free-hand technique described below. After the message has been created, the ISC (80) stores the message content and provides the message data to the microprocessor (40) for further processing. One way in which this differs from conventional SMS messaging is that, conventionally, the SIM card stores the SMS message content and delivers it to the microprocessor (40).

To facilitate free-hand drawing of the message to be sent, a graphic entry device, such as touch-sensitive pad (10), is added to the handset, if it is not already included on the handset, that enables the user to draw or write his/her message in free-hand style, as opposed to entering the message using keystrokes on the keypad of the handset. In accordance with the present embodiment, pad (10) can be operated by a standard writing device, such as a pen, pencil or stylus (20). In this embodiment, device (20) need not have any special writing capabilities except the pressure that it provides on the pad (10). For example, respective areas on the pad can be designated for particular functions and these areas can be made sensitive to pressure applied by the stylus (20) in order to carry out the corresponding function when the respective area on the pad is pressed, or written on.

One such area on the pad (10) can be designated for data entry of the freehand message. For example, in the message entry area, the user draws or writes the desired message in free-hand form. The free-hand message can include text characters or free-hand drawings, or both. Additionally, if desired, the system can include a handwriting recognition device, such as an OCR (Optical Character Recognition) device that recognizes text characters from free-hand written characters or typed fonts and converts them into regular text font before the message is transmitted. Prior art pen-based computing systems are capable of recognizing hand-written characters. Such systems are available from 3Com and Microsoft.

In reference to FIG. 2, pad (10) represents an input device in accordance with one exemplary embodiment of the present invention by which free-hand written messages can be entered. According to this embodiment, pad (10) is location sensitive. As mentioned above, this means that when an action takes place on a designated area of the pad, for example, the area is pressed, written on or otherwise activated, the designated area of the pad sends data to ISC (80) representing the physical location on the pad where the action has taken place. Additionally, pad (10) may also have designated areas with which a specific application or function is assigned. For example, when such a designated area is activated, a pre-designated command is sent to the microprocessor which carries out a specific function in response.

A non-limiting example of the structure and functionality of pad (10) is as follows.

Pad (10) has a free-hand writing area (220) in which the user can write or draw any object and in any language he chooses. For example, the user may draw a picture, sign his name or write a message in any language. Prior to creating the desired message in area 220, the user activates the create function, for example, by pressing or tapping the Create area (230) on pad (10). Also, if the user wishes to have an OCR operation performed on the message, the user activates the Text Included area (240) of the pad. This particular function can be activated either before or after the message is created.

At any time during the creation of the message, the message can be saved to the ISC (80) by activating the Save function by pressing the Save area (235) on the pad. After the message has been saved in the ISC (80), the user can then view the message by activating Display area (250) on the pad. According to one embodiment of the invention, display on the GSM handset screen of the freehand created message stored in ISC (80), is possible by using a proactive SIM application Toolkit command that prompts the SIM card to request action by the master microprocessor. For example, a routine can be written using the SIM Application Toolkit that displays the SMS message on the screen of the handset in response to tapping the Display area (250) on the pad (10).

The SIM Application Toolkit is defined in GSM standard 11.14 (ETSI TS 101 267). According to a SIM application Toolkit command such as the one described above, the ISC (80) asks the microprocessor (40) for control of the display of the handset, and writes to it once permission is granted. Accordingly, the microprocessor (40) hands over to the ISC (80) control of the handset display.

When creation of the message to be sent is complete, the user initiates storage of the message by activating the Message Ready for Sending area (260). The created message is then formatted for SMS transmission by dividing the message data, either text data or binary data, into units having 160 bytes, or less, each. It should be stressed, however, as mentioned previously, other types of message transmissions can be used in accordance with the present invention. For example, by activating Message Type area (280) on pad (10), a user can select from various message types, such as, facsimile, e-mail, SMS, etc. Message Type area (280) can be divided into various sub-areas, each corresponding to a different data type. When any of the individual sub-areas is activated, the portion of the system responsible for message processing, i.e., a network server located at the mobile service provider's premises, or the ISC, will process the message, accordingly, to format the message for proper transmittal in the format selected by the user.

After the message has been entered, the user can activate the OCR function by pressing the Text Included area (240) on the pad. The default language of the OCR is conveniently programmed to be the language recognized by the other handset functions, however, it is possible to support various languages for OCR operations by storing language variable OCR software in the ISC (80). For example, if the user wishes to send a free-hand text message in an alternative language, he can do it by pressing the Language button (270) on the pad (10), and specifying the language by free-hand writing the language name in the language recognized by the default OCR. Subsequently, after the Language button (270) has been activated and the default language has been processed by the default OCR facility, the message text can be processed by an OCR program suitable for the alternative language selected.

Other features can be added to the message entry function in accordance with an embodiment of the invention by providing additional areas to pad (10). For example, given the limited physical area of Free-Hand writing area (220), it is conceivable that a message entered by a user may extend beyond the boundaries of the writing area (220). Accordingly, a Scroll function can be added by providing a Scroll area (275) on pad (10). When the Scroll area (275) is activated, the message, as presently entered on area (220), is stored in ISC (80) and the area (220) is cleared in order to enable further message entry. This process can be repeated as many times as necessary to allow the user to complete his message.

An additional feature to the Scroll function described above is having a portion of the message from the previous screen remain within area (220) after the Scroll area is activated. In this manner, the user is able to view a relevant portion of the message from the previous screen and is, thus, able to continue with the message from exactly the point where the user left off on the previous screen. For example, if the user is entering a message written in cursive writing, and the written message runs beyond area (220) of the pad, the user can activate the Scroll function and the last portion, for example, 10%, of the message written within area (220) can be displayed on the next screen, while the remaining 90% of the message is stored in ISC (80).

In regard to the physical construction of pad (10), the pad can be constructed of an inexpensive foil connected to a handset (30) by glue or some other equivalent fastening mechanism. Other possible message and data entry modes in regard to the free-hand drawn SMS message include a "pen style" mouse that has an infrared link that can communicate with most newer handsets. Further, similar to the pad mentioned above, the infrared, pen-style mouse enables free-hand input to a handset as opposed to existing devices that use handset proprietary features to communicate with the handset and need expensive special proprietary adapters connected to the handset.

For example, Nokia (Nokia Inc., 6000 Connection Dr. Irving, Tex. 75039) offers a handset with an infrared input device. This infrared input device could be interfaced with the ISC to provide an input mechanism in accordance with the present invention without using a pad. The present invention simplifies and "standardizes" the communication between the input device and the GSM instrument/handset.

Another option for message/data entry is an ultrasonic communication device such as the one made by Pegasus, (Pegasus Technologies, 27, Hamzuda St. Azur, Israel) which uses ultrasonic devices connected to an external connector of a handset in a proprietary manner. An ultrasonic device is put on a pen in such a way that the movement of the pen can be monitored and translated into a picture and then an OCR application is run to convert the picture into text.

FIG. 3, illustrates the architecture of the Intermediate Smart Card (ISC) (80) which will be discussed below.

According to a further embodiment of the present invention, the functionality of ISC (80) can be integrated within SIM card (50), enabling the usage of only one card instead of two cards, i.e., a SIM card and an ISC. This configuration would require modifying the current SIM card within the handset. For example, additional information, such as a digital phone book, SMS messages or executable code, could be stored within the memory section of the ISC. Providing a separate ISC card that interfaces with the current SIM card and/or microprocessor within the handset, however, avoids the need for modifying the current SIM card and permits the present invention to be added to presently available handsets.

One function of the ISC (80) is to, when necessary, divide free-hand created message into smaller messages. For example, at present, the maximum allowable size of an SMS message, as defined by the GSM standard, is 160 characters. Accordingly, if a free-hand drawn message exceeds the equivalent of 160 characters, the ISC (80) must divide the free-hand message into the required 160 character format.

Message division can be performed within the Quantizator (320) module of ISC (80) by packetizing each of the free-hand messages that have been entered on pad (10) and stored within the memory module contained within ISC (80) into units of 160 characters, each comprising 8 bits of data. Each character can be either an ASCII character or binary data. For instance, once an OCR function has been performed on the free-hand message, if the resulting message contains ASCII coded symbols, each ASCII symbol constitutes a character.

Alternatively, if the message contains a picture, or some other free-hand drawn graphic that does not represent an ASCII character and, thus does not result in ASCII characters after an OCR function is performed, then the raw binary data that represents the picture and which is derived from the data entry device is converted into units that are the equivalent of 160 ASCII characters. Furthermore, as will be discussed later, a header is attached to each of the divided units which contains information that makes it possible for a receiving device to reassemble the divided units back into the original intended order, thus recreating the original message. When a message is still in the form of a continuous freehand drawn message, i.e., before the OCR function has been performed and the resultant message has been placed within the ISC (80) or a Network Server, as discussed later, or if the message does not include characters at all but only contains a drawing, the message should be encoded before it is divided and sent through the network to an intended recipient.

Encoding is done by the encoder module (350) within the ISC (80). One encoding method in accordance with the present invention is performed in the following manner.

Free-hand drawn or written SMS messages entered onto the pad comprise a set of position tracking coordinates that are translated into a mathematical function. The resulting mathematical function defines the way in which the independent coordinates are connected. The mathematical function, which includes information, or parameters, necessary to recover the coordinates upon "decoding" the mathematical function, is "cut", or limited, into "slices", each containing 160 ASCII characters in order to fit into the quantization predefined by specification for SMS messaging.

As mentioned above, in the initial divided SMS message, or slice, a unique header is inserted, along with the data content. This unique header contains information that informs the decoder on the receiving end of the message that the next N SMS messages (N typically being an integer) comprise a single free-hand SMS message. In accordance with one embodiment of the invention, the encoded SMS message is then routed to a network Server where the decoding function is performed. However, decoding can be performed elsewhere, such as in the ISC of the receiving handset.

After the message has been decoded, OCR can be performed to recover any characters that may have been included in the original SMS message. Again, it should be noted that the decoding function and the OCR function can be performed in areas other than the network server. For example, the ISC, within the receiving handset, can be equipped to perform these tasks. Subsequent to performing OCR on the message, the server can further encode the message, if desired. For instance, similar to the way by which the encoding of the coordinates assists in carrying out OCR, other such encoding techniques can be employed to assist in the efficient transmittal of non-character, or picture, messages.

A bitmap, for example, is a format for transmitting raw picture data based on the coordinates of the drawn picture. Jpeg is a technique for compressing picture data to reduce the amount of information that actually must be sent to the receiving side of the transmission but, at the same time, including enough information to allow for accurate recreation of the picture when the message is decoded.

Thus, the server can compress the data if necessary and concatenate the encoded data into slices of 160 ASCII characters, or binary data, in order to efficiently send the message data to the end user device.

In FIG. 4, Server (440) reads and decodes the encoded/quantized message. Additionally, Server (440) runs the OCR facility on the message if it determined that the OCR function will reside in the Server, as opposed to the ISC within the handset (30). Other functions, such as signature authentication, discussed later, can also be allocated to Server (440).

The ISC (80), as shown in FIG. 3, also includes a memory module (340) operable to store all SMS messages both created using pad (10) and received through the antenna (35), shown in FIG. 1, of the handset from another user. When the microprocessor (40) of the handset (30) is searching for, sending or reading, an SMS message to/from the SIM card (50), the microprocessor (40) receives the message from the memory module (340) of the ISC (80), regardless whether the message is a traditional ASCII-type SMS message or free-hand SMS message. Lastly, as already discussed, the OCR module (330), shown in FIG. 3, can be omitted from the ISC (80) and the OCR function, alternatively, placed at the Server (440).

According to one embodiment of the present invention, the ISC (80) can be a very thin card installed in the space between the battery and the handset (30) in a way that will suit a majority of the presently available handsets. As mentioned above, without disrupting communications between the SIM card and the master microprocessor, the ISC (80) is connected in parallel to the SIM bus defined by GSM 11.11. The ISC (80) is, thus, permitted to "see" all communications being transmitted on the bus and is able to select those communications that are intended for the ISC, and ignore those communicatrions that are not intended for the ISC. Also, the ISC (80) is able to generate communications and place them on the bus without disrupting other communications on the bus.

The free-hand message content entered using pad (10) is ideally transmitted at a resolution that fits the display of the cellular handset (30) or, at least, in a way that will fit the lowest resolution of available GSM handsets. Accordingly, interoperability with most existing GSM handsets is obtained.

As discussed above, when the handset (30) receives a message from the Free-Hand Messaging Server (440) the message can be encoded. Therefore, as shown in FIG. 3, the ISC (80) includes a decoding module (360). If a "regular" SMS message is received, i.e., one that, based on the information within the header of the message, is not free-hand drawn, the ISC (80) is not involved in a substantial way. In other words, if upon receipt of an SMS message it is determined, from the header information that accompanies each SMS message, that the message has not been created using free-hand drawing, i.e., it has been created using the conventional method of typing characters and text on the handset keypad, the ISC need not be involved and the message can be routed directly to the SIM card and to the microprocessor (40). However, if desired, the ISC can be used to store the conventional SMS message, instead of the memory within the SIM card, in order to provide additional storage space for incoming/outgoing messages.

In order to enable the service of free-hand created SMS and other features, such as free-hand animation messages or picture messages, Server (440) is added to the SMSC (430). Server (440), as discussed above, can provide OCR services, and may have OCR capability in many languages, etc. The architecture shown in FIG. 4 includes basic elements of the GSM network: Base station (450) performs the radio communication with the handsets (30), MSC (420) is the switching device, the SMSC (430) is the server that provides the SMS services and the innovative Free-hand Messaging Server (440) that will be connected to the SMSC.

At this point, one specific example of how the present invention can be utilized will be discussed. Digital signatures are becoming an element of ever-increasing importance in today's business world. For example, as far as mobile commerce or banking is concerned, it seems reasonable to imagine the need for free-hand signatures that are available over a mobile network. More specifically, in regard to the present invention, Server (440) is capable of storing digital freehand signatures that can be compared to signatures previously or subsequently provided by users to confirm a certain business transaction, etc.

A user having only a cellular device that he uses as a terminal for mobile commerce or mobile banking is connected via a voice call to a mobile commerce center or to a mobile banking center, etc. At some point, the user is prompted for his signature. The signature can be written on pad (10) and sent to a Server (440) for authentication using Signature Authentication Module (550), shown in FIG. 5, or the signature can be provided to the Server (440) along with a personal code so the Server can confirm to the banking center that the signature has been received.

Whether or not authentication of the signature is required depends on the services available from the service provider. However, if further action is intended to be performed on the signature, the service provider should be informed that the signature was provided alone or was provided and authenticated. In the case where the signature only is provided, the service provider keeps the free hand signatures in a special dedicated server.

In order to store a signature on the server for future use of the authentication service, the mobile user is given a unique code and asked to send an SMS message to a certain telephone number. In the SMS message the user then inputs the code he has been provided as well as his signature in free-hand SMS form. The server reads the SMS and then "knows", based on the code, which user's signature was provided. The signature is then saved in the Free hand signature server (440) and/or confirmation that the specified user's signature was received is passed along to the service provider.

Subsequently, when a free hand mobile signature is to be authenticated, an authentication module (550) within Server (440) compares an independently provided signature to the stored one (using comparison software that compares two saved images). Companies that provide products that perform such image comparison are Eshed Robotec, Israel and Grip, Israel. Based on the results of this comparison, the authentication server then provides an answer—i.e., signature authentication PASSED, or signature authentication FAILED.

FIG. 5 illustrates the structure of the Free-hand Messaging Server (440). Free-hand Messaging Server (440) optionally includes the OCR module (520). This module can identify characters drawn by free-hand and sent encoded to the server (440). Also, Server (440) can decode SMS messages by using the decoding module (540) and authenticate signatures as discussed above, using signature authentication module (550).

The Server (440) also includes an SMSC Interface module (510). SMSC Interface module (510) is responsible for the communication with the SMSC server (430). In case the free-hand messaging server (440) has to send a large message that includes more than a single 160 character-based message, the Server (440) includes a concatenation module (530) that provides the SMSC with a concatenated message to be sent as one single message. The concatenation ability of Server (440) is important, especially with respect to the EMS (Enhanced SMS) service where much more information is transferred in a single message as compared to a normal SMS message.

In accordance with an embodiment of the present invention, a special header is added to a string of SMS messages. The header is added at the beginning of the first SMS message and indicates that the SMS message to which it is attached is the first one of a set. Further, as is known in the prior art, binary data can be sent within an SMS message, instead of ASCII characters. In accordance with a further embodiment of the present invention, the free-hand messages received by the mobile device need not necessarily have been created using another mobile device. For example, it is possible that the free-hand message be created on a desk top computer, using a drawing program. In this case, the free-hand drawn message can be actually drawn "free-hand" by the user on a data entry device similar to the touch pad on the handset described above, or the message can be a drawing entered by the user using a computer graphics program. The message can then be converted to an SMS message, or any of the other formats disclosed herein, and sent to the intended recipient in similar fashion as described above. Upon reception by the intended recipient, the SMS message is then converted back to its original free-hand drawn format and displayed on the recipients screen.

The process of creating, sending and receiving a free-hand drawn SMS message in accordance with the present invention will now be described.

FIGS. 6 and 7 include flow charts that describe a process in accordance with the present invention. Numbers presented in boldface represent corresponding process numbers as shown in the figures.

Referring to FIG. 6, the user activates Messages Creation Menu on his cellular handset (30) (1020). According to both the present invention as well as the conventional SMS messaging technique, the handset (30) then waits for message creation in order to store a message in the SIM card (50) or send the message via the cellular network (410) (1030). In accordance with the present invention, the user then presses the Create button (230) on the pad (10) in order to prepare the handset for entry of a hand-written or hand-drawn message. (1040).

In order to inform the system that a free-hand message has been entered that includes text, the user presses the Text Included (240) button on the pad (10) (1050).

The user then enters a free-hand drawing or written message by using the pad (10) (1060).

When finished drawing/writing the message, the user presses the Message Ready for sending button (260) in order to notify the ISC (80) that it can store this message as a message that is ready to be transmitted to an intended recipient. (1070).

When the message has been defined as a "ready" message (1070), the user presses the Display button (250) in order to view the message on the display screen of the handset (30) (1080).

Further, when the message has been defined as a "ready" message (1070), the user can specify a different language for the text he has entered. This can be done by pressing the Language button (270) on the pad (10). This means that the system will try to identify the text characters by using a dedicated OCR to the language that was specified by the user. The default language is the language that the handset (30) was configured to work in (1090).

The created message can go through an optional OCR function that is located either within the ISC (80) or in the Server (440). (3000). If the OCR is located within the ISC (3010), the created message goes through this OCR, located within the ISC (80) (3100).

The message is encoded and divided into a message with a maximum size of 160 characters. This is be done in the ISC (80).(3110). These divided messages are preferably each given a tag that should also be sent along with the message content. For example, because the complete free-hand drawn SMS message may have been cut, or quantized, into smaller discrete messages, i.e., each having 160 characters, it is desirable to provide a serial number, or some other similar identifier, that can be included within a header of the message and which informs the receiving device that the quantized message attached to the header is part of a larger message and, further, informs the receiving device how to reconstruct the complete message in the proper order.

The tag is processed by the microprocessor of the handset (30) in order to send the messages in a concatenated way. (3120). The user initiates the sending of the message he has created by entering the send message menu (not shown) on his handset device (30) of FIG. 1. The user will then be informed that the handset is waiting to send a new "ready" message. The microprocessor (40) is able to recognize the free-hand drawn SMS message as a ready message because the ISC (80) has provided the microprocessor (40) with the necessary information by initiating a command in accordance with GSM 11.11 and placing the command on the bus, to which the microprocessor is connected.

The user then presses "send message" in the send menu mentioned above. (3130). The message is sent to the messaging server—the SMSC (430) which will forward it to the Free-hand Messaging Server (440). In the Free-hand Messaging Server (440), the message is decoded (3140). The message is then forwarded back to the SMSC (430) for forwarding it further to its destination. (3150).

If the OCR is not located in the ISC (80) then the message is provided back to the SMSC (430) for forwarding it further to the Free-hand Messaging Server (440), (3020). A notice about the language of the message is then provided to the server (440) encoded within the message. (3200). The message is encoded and divided into a maximum size of 160 characters. The division is done in the ISC (80). (3210). These divided messages should be given a tag that should be sent along with the messages. The tags are recognized by the microprocessor and contain information used by the microprocessor to place the divided messages back into the proper sequence to recreate the original "undivided" message. Such a tag will be understood by the microprocessor of the handset (30) in order to send them in a concatenated way (3220). The user initiates the sending of the message he has created by entering the send message menu on his handset device (30). The user is then notified that a new ready message is waiting to be sent. As mentioned before, this notification is possible because the ISC (80) has provided the microprocessor (40) with the necessary information regarding the created SMS message.

The user then activates the "send message" routine in the menu mentioned above. (3230). The message is sent to the messaging server—the SMSC (430) which will forward the message to the Free-hand Messaging Server (440). In order to route the message to the appropriate free-hand messaging server, a number identifying the appropriate server can be stored within the ISC. This number is then provided to the microprocessor which uses the number to address the SMS message to the appropriate server. In the Free-hand Messaging Server (440), the message is decoded. (3240). The message is OCR checked (3250) and the message is forwarded back to the SMSC (430) for forwarding it further to its destination. (3260).

According to FIG. 7, when a Short Message (SMS) arrives at the cellular handset (2010), the message is normally sent directly to the SIM card (50) for storage. However, in accordance with the present invention, because the ISC (80) has access to the communication bus between the microprocessor and the SIM card (50), the message is moved to the ISC (80) transparent to the microprocessor (40). In other words, the SMS message can be stored in the ISC (80) without disturbing the communication between the SIM card (50) and the microprocessor (40) (2020).

The ISC (80) decodes the message it has received from the Free-hand Messaging Server (440). In case the message is a regular, non-free-hand drawn, SMS, the ISC (80) will not be involved. However, as mentioned previously, the ISC (80) can be utilized for storing regular SMS messages in order to provide additional storage capacity. (2030).

The messages received and stored within the ISC (80) can be accessed by pressing relevant keys on the handset as if a regular SMS message has been received. If desired, the user can view the received message by scanning through a list of messages stored in the handset (2040). For example, a list of the received messages can be displayed on the handset with the sender's telephone number and an icon identifying whether the message is a free-hand message or a non free-hand message. The user can then tap on the message that he wishes to display and the corresponding message is displayed.

What is claimed is:
1. A communication device comprising:
a master microprocessor;
a security identity module operably connected to the master microprocessor through a bus;
a buffering device operable to communicate with said master microprocessor;
a character recognition device operable to recognize handwritten characters provided in a first message and convert the handwritten characters into text,
wherein said master microprocessor is operable to receive said first message from the buffering device or the security identity module;
wherein said buffering device is operably connected to the bus between the master microprocessor and the security identity module;
wherein each of the master microprocessor and the buffering device is capable of controlling the character recognition device, and
wherein the communication device is a handset, and transmits said first message, with said text therein, via a communication network;
a receiving portion operable to receive a second message in a form of a standard SMS message; and
a conversion device operable to convert said second message into a freehand drawn message.

2. A communication device as set forth in claim 1, wherein said buffering device comprises:
a quantizer operable to transform said first message into a collection of quantized messages.

3. A communication device as set forth in claim 1, wherein said bus is defined by GSM (Global System for Mobile Communication) standard 11.11.

4. A communication device as set forth in claim 1, wherein said communication device is compatible with GSM (Global System for Mobile Communication) standards.

5. A communication device as set forth in claim 1, wherein said communication device is a GSM (Global System for Mobile Communication) telephone.

6. A communication device as set forth in claim 1, wherein said communication device is a PDA (Personal Digital Assistant).

7. A communication device as set forth in claim 1, wherein said communication device is a wireless device.

8. A communication device as set forth in claim 1, further comprising:
a message entry device operable to provide said buffering device with said first message in a form of a free-hand drawn message entered by a user with said message entry device.

9. The communication device as set forth in claim 1, comprising:
wherein said buffering device is further operable to receive said first message in a form of a standard SMS message input on the communication device and a free-hand created message input using a free-hand compatible data entry device.

10. A communication device as set forth in claim 2, wherein said buffering device further comprises:
a memory module operable to store said first message; and
an encoder operable to encode said first message prior to transmitting said first message.

11. A communication device as set forth in claim 8, wherein said message entry device comprises:
a free-hand writing area in which said first message can be entered.

12. A communication device as set forth in claim 8, wherein said first message comprises handwritten text, hand-drawn pictures, or both.

13. The communication device as set forth in claim 9, wherein said free-hand created message can be transmitted as an SMS message, a facsimile message or an e-mail message.

14. A communication device as set forth in claim 10, wherein said buffering device further comprises:
a decoder operable to decode received messages.

15. A communication device as set forth in claim 11, wherein said message entry device further comprises:
- a create portion operable to place said communication device in a freehand message entry mode when activated; and
- a save portion operable to store said first message into said buffering device.

16. A communication device as set forth in claim 12, wherein said message entry device comprises:
- a text included portion operable to notify the master microprocessor that an optical character recognition function should be performed on said first message; and
- a language portion operable to notify the master microprocessor that the optical character recognition facility to be performed is different than a default language associated with the communication device.

\* \* \* \* \*